United States Patent

Hagman et al.

[11] Patent Number: 5,957,445
[45] Date of Patent: Sep. 28, 1999

[54] ERGONOMIC WORKHOLDER WITH POSITIONAL CONTROL

[76] Inventors: Erland L. Hagman; Michael S. Valentine, both of 11 Old Newtown Rd., Danbury, Conn. 06810

[21] Appl. No.: 09/056,815

[22] Filed: Apr. 8, 1998

[51] Int. Cl.[6] ................................................. B23Q 1/04
[52] U.S. Cl. ................................................................ 269/75
[58] Field of Search ............................ 248/181.1, 182.1, 248/276.1, 288.31, 288.51, 481; 269/75

[56] References Cited

U.S. PATENT DOCUMENTS

| | | | |
|---|---|---|---|
| 848,469 | 3/1907 | Kohler | 248/181.1 |
| 1,168,727 | 1/1916 | Jenigar | 248/181.1 |
| 2,354,937 | 8/1944 | Barker | 269/75 |
| 2,528,053 | 10/1950 | Harris | 269/75 |
| 3,957,241 | 5/1976 | Morris et al. | 248/181.1 |

*Primary Examiner*—Robert C. Watson
*Attorney, Agent, or Firm*—Edward R. Hyde

[57] ABSTRACT

A ball and socket workpiece holder is provided that may be locked to hold a workpiece in a predetermined position on a workholder arm. The workholder may be unlocked to permit the workholder arm and workpiece to rotate through a limited predetermined angle.

3 Claims, 3 Drawing Sheets

ERGONOMIC WORKHOLDER WITH POSITIONAL CONTROL

BACKGROUND OF THE INVENTION

1. Field of the Invention

The present invention relates to a universal workpiece positioner and more particularly to a holder for a workpiece to be operated upon in which the workpiece may be moved and retained in designated positions.

In the fabrication of various items it is regularly necessary to position the item in a convenient orientation to perform operations. The item to be worked on may take various forms and sizes and may be as small as a circuit board or as large as perhaps a section of an automobile body panel.

The present invention relates to a workpiece which is relativly small to accomodate items that need to be formed or fabricated to meet precise specification.

2. Description of the Prior Art

There currently exists numerous universal ball and socket type workholders for securing workpieces in particular orientations. Conventionally, the ball has an arm secured to it with an outer end which is adapted to receive an item to be worked upon. The arm may be moved manually until a designed workpiece orientation is achieved and then the ball is locked into position. Examples of the prior art applying this manually operable ball and socket arrangement are U.S. Pat. Nos. 2,354,937 and 2,559,925.

In these and other prior art devices, the workpiece secured to the rotating ball can be pivoted to an extent of the opening in the corresponding socket and rotated about its axis without limitation.

In some fabrication processes it is desireable to, have an automatic rotation limit stop for the workpiece without reducing pivotal movement and it is to this object that the present invention is directed.

SUMMARY OF THE INVENTION

In some fabrication processes it is desireable to have complete movement of the workholder arm in both pivoting and rotational directions. However, in other processors there is an advantage to have an automatic stop or limit in the rotational movement of the workpiece. For example, in dental schools where the workpiece that is being operated upon may be a set of teeth, accurately positioned in a dummy human head there is an advantage to have the head pivot and rotation limited. Thus in a dental school set up a set of teeth secured in the dummy head which is directly attached to the workholder, allows the student to replicate the true work positions of the teeth as it would be if he were performing a dental function on a human being. One feature of the present invention is to provide permanent rotation and pivotal movement limits for the workpiece arm.

Accordingly, the primary object of the present invention is to provide a workpiece holder of the ball and socket type in which there is a limit to which the ball can be simultaneously rotated and tilted.

Another object of the present invention is to provide a workpiece holder in which the ball of a universal joint can be locked in a preset position by an efficient and convenient mechanism.

It is a still further object of the present invention to provide a workpiece holder of the universal ball and socket type having a workholder in which rotation of the arm is limited by a predetermined amount in both the clockwise and counterclockwise direction.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein in which.

DESCRIPTION OF THE PREFERRED EMBODIMENT

Figure 1:
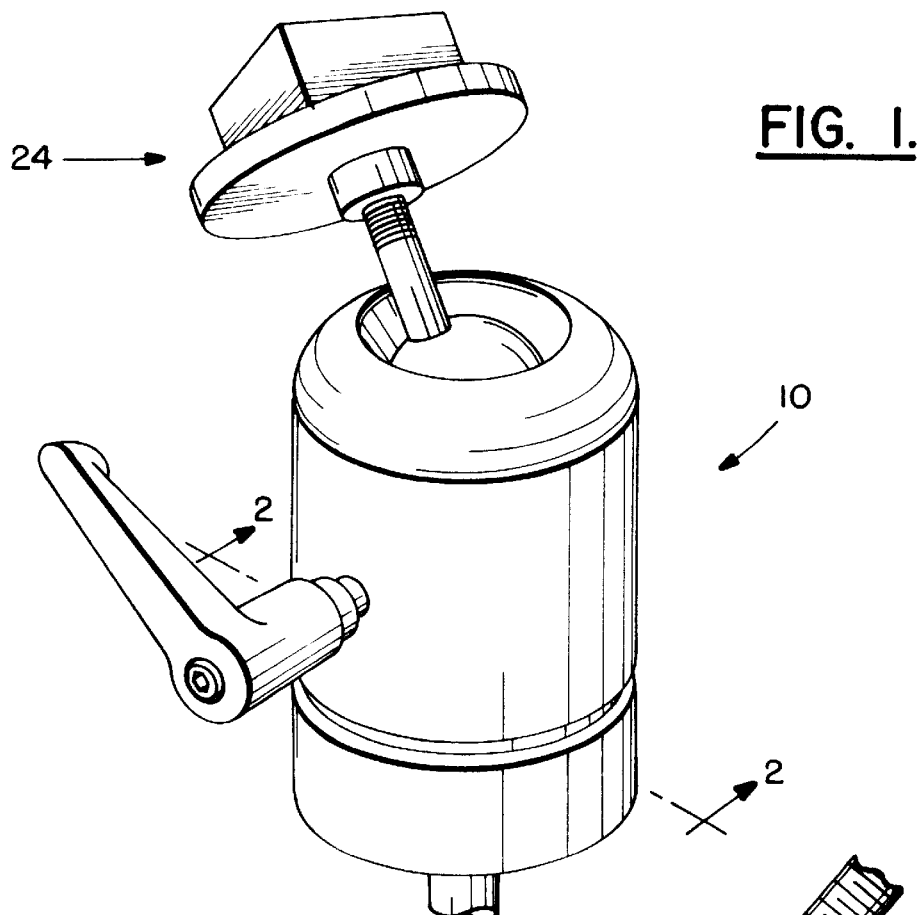
FIG. 1 is a perspective view at the workholder of the present invention.
Figure 2:
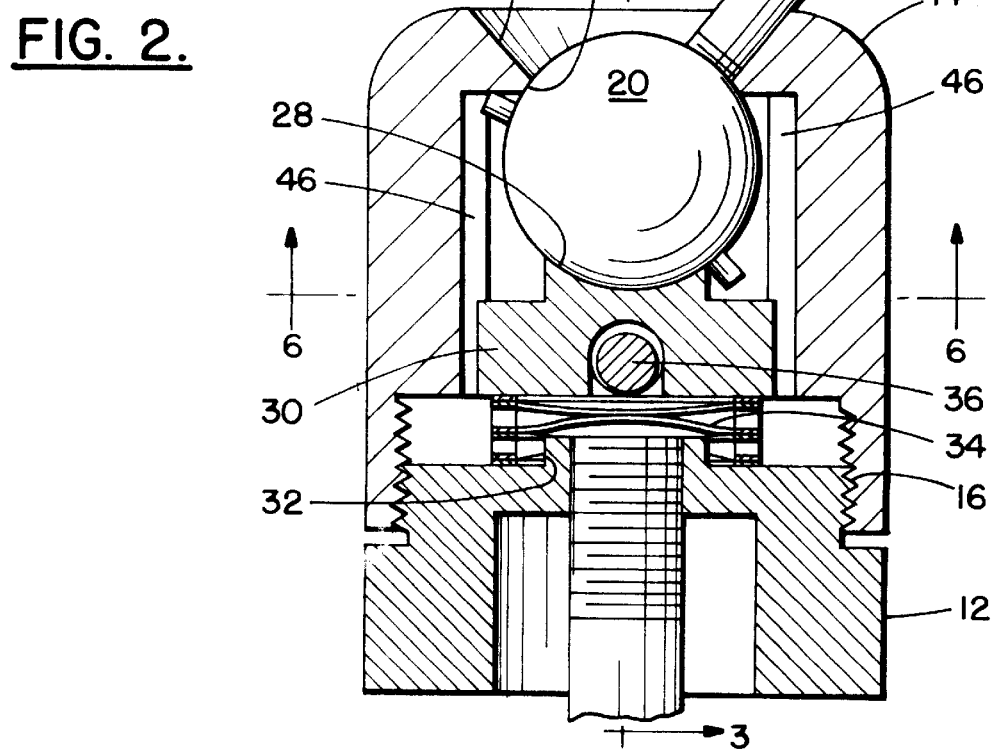
FIG. 2 is a cross section taken on the line 2—2 of FIG. 1.

Referring now to the drawings and more particularly to FIGS. 1 and 2 there is shown a workpiece holder generally designated 10 which includes a base block 12 and upper block 14 which may be made of any suitable composite such as aluminum alloy or stainless steel. It is seen in FIG. 2 that the base and upper block are screwthreaded at 16 in order to be secured together. The upper end of block 14 has an opening 18 which receives the upper portion of ball 20 to which is secured an arm 22 that may be threaded at the end to conveniently receive a workpiece generally indicated as 24.

The ball 20 is held in place by an upper spherical edge 26 of the opening 18 and by a surface 28 of lock pad 30 which is located in the hollow lower portion of upper block 14. It is seen that ball 20 may be permitted to rotate in place within surface 28 and upper opening edge 26. Accordingly the arm 22 may be both simultaneously pivoted and rotated to correspondingly rotate ball 20 within its confined position.

Figure 3:
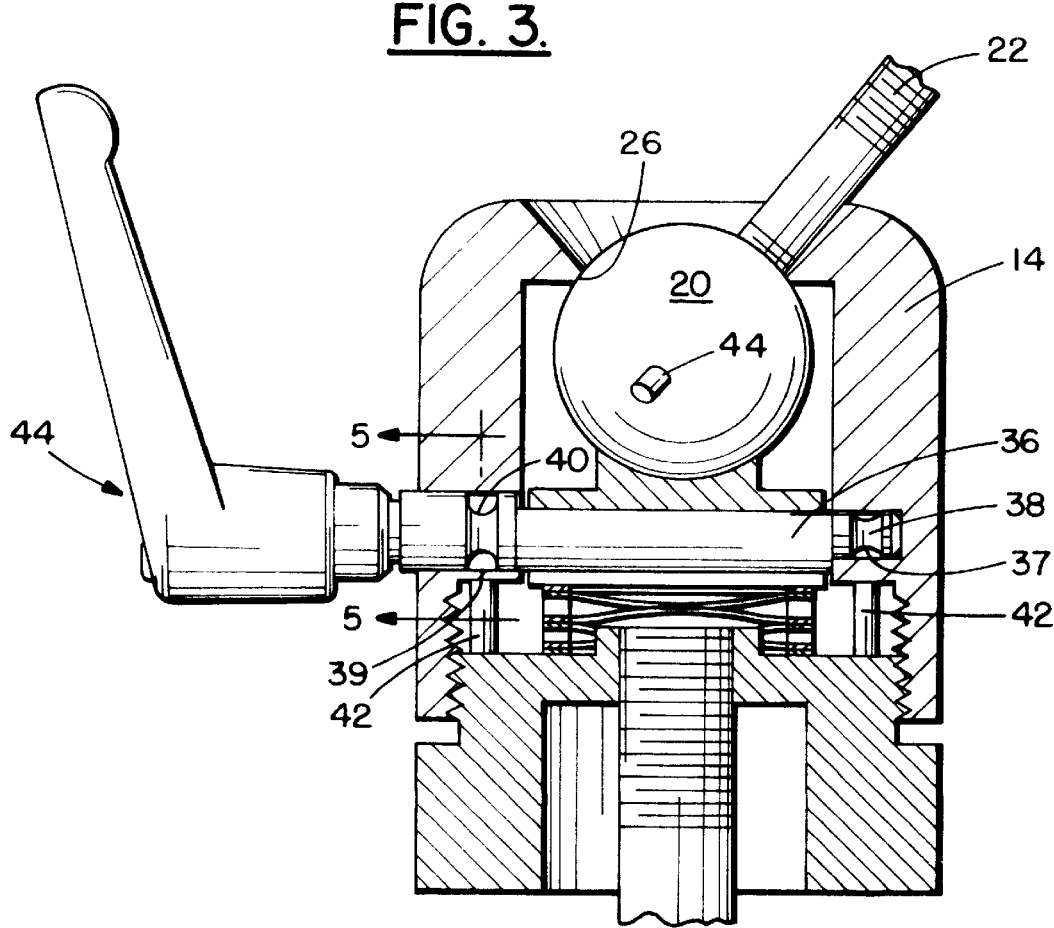
FIG. 3 is a cross section taken on the line 3—3 of FIG. 2

The upper surface of base block 12 has an upstanding boss 32 around which is located compression spring 34 which abuts against the lower surface of lock pad 30 as more clearly seen in FIGS. 2 and 3. In this manner the lock pad and correspondingly the ball 20 are urged upward under the pressure of the spring 34 to provide a desirable friction when the ball is unlocked and free to rotate. This degree of friction is adjustable by the amount of compression of spring 34 by turning lower block 12 clockwise or counter clockwise.

It is understood that the operator will desire the workpiece to be held in a predetermined orientation in order to perform the necessary work on the item. He will move the workpiece to the orientation manually by pivoting and rotating the arm 22. With the workpiece properly oriented the operator will then lock the ball and correspondingly its arm in the chosen position. The mechanism for this includes a centrally mounted shaft 36 passing through the side wall of upper block 14 as more clearly seen in FIG. 3.

One end of shaft 36 passes through the lock pad and extends into a recess 37 in the internal wall of block 14 and has a groove end 38 as seen in FIG. 3 whereas the other end of the shaft passes through the diametrically opposite spaced opening 39 in block 14 and has a circular groove 40.

Figure 5:
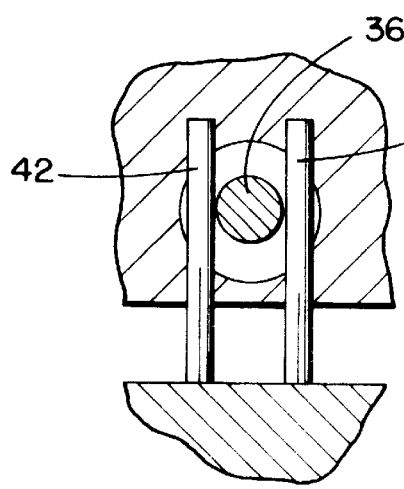
FIG. 5 is a view taken on the line 5—5 of FIG. 3.

The purpose of grooves 38 and 40 is to receive four metal dowel pins 42, as seen more clearly in FIG. 5, which serve to retain the shaft in position and permitting it to rotate. The extended end of the shaft 36 has a handle mechanism 44 so that the shaft can be rotated manually by operating the handle. Because the shaft 36 is eccentrically mounted, rotation of the handle in one direction will cause it to permit the lock pad 30 to release the ball thereby permitting manual rotation thereof. Movement of the handle in the opposite direction will cause the central shaft 36 to press upward against the opening in the lock pad thereby locking the ball in position through the friction between the surface 28 of the lock pad and the surface of the ball 20. FIG. 2 discloses the central shaft in its lower or release position permitting rotation of the ball whereas FIG. 3 illustrates the shaft in its raised position passing through the lock pad and urging it upwards to lock the ball in position.

Figure 6:
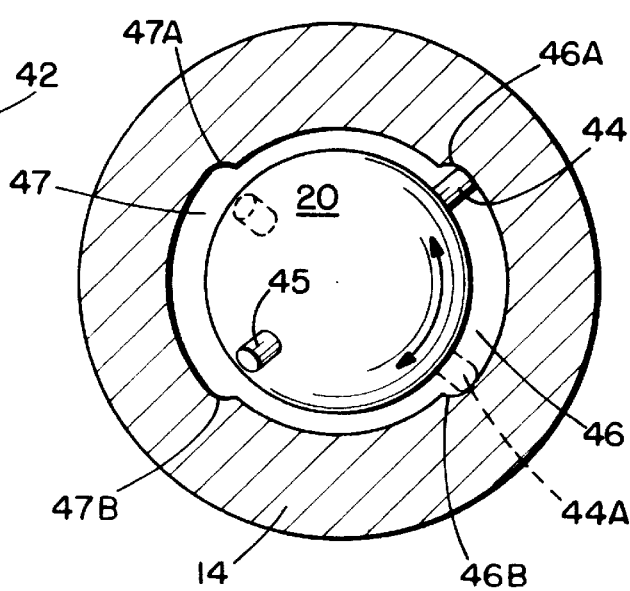
FIG. 6 is a cross section taken on the line 6—6 of FIG. 2.
Figure 4:
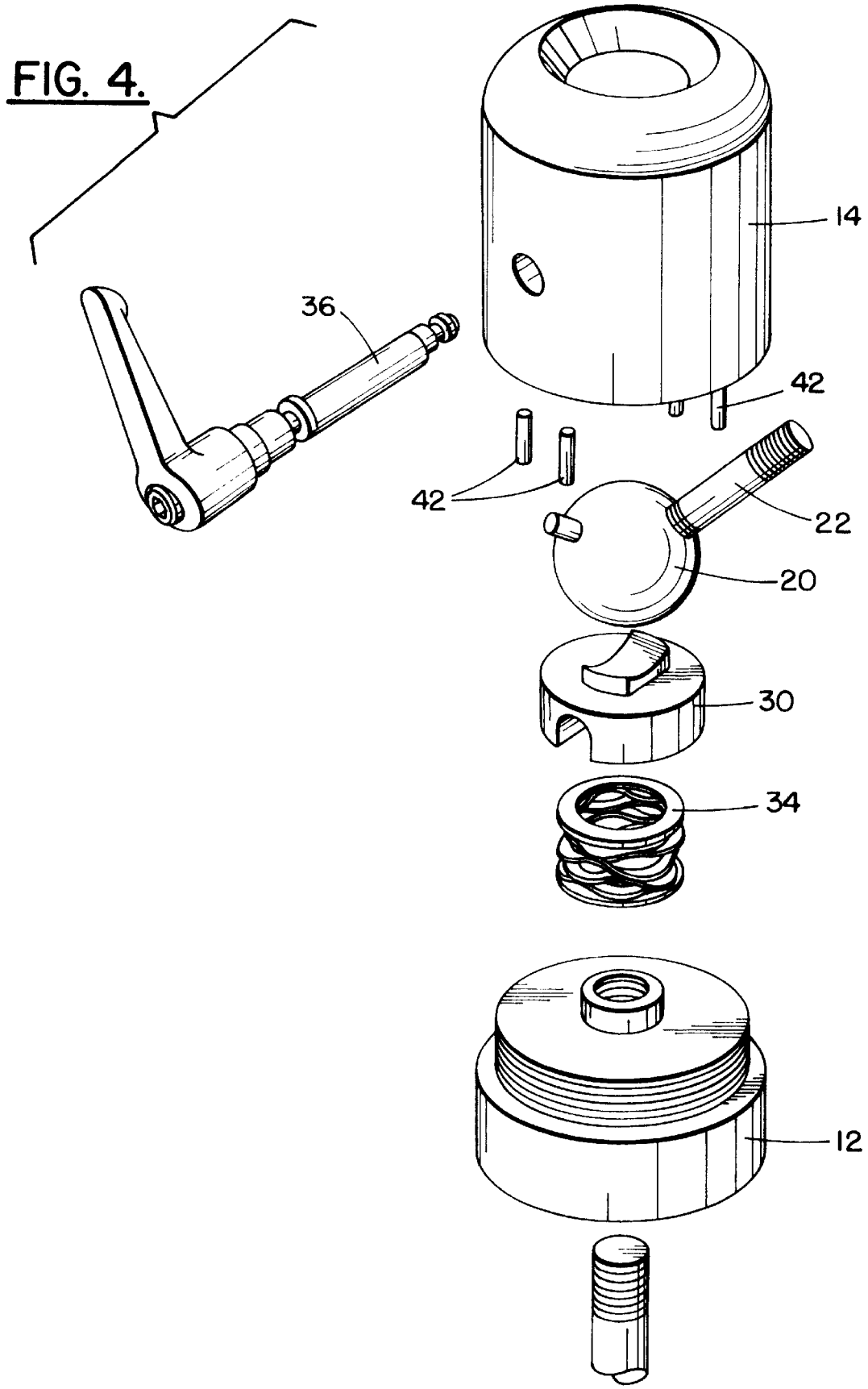
FIG. 4 is an exploded view.

A particular feature of the present invention is the rotational limit arrangement of the arm 22. This is effected by two locating pins 44,45 extending outward in the surface of ball 20. Referring now to FIG. 6 it is seen that the generally cylindrical inner side of upper block 14 has two depressed areas 46,47 that receive pins 44,45 respectively. The depressions 46,47 are diamentrically opposed and of equal radial angles. Pin 44 is shown abutting one end 46A of depression 46 which limits the rotational movement of arm 22. It is further seen if arm 22 is rotated, the same pin 44 will move to its limiting position 44A against the opposite end 46B of the depression 46. The illustration in FIG. 6 corresponds to the situation of arm 22 being pivoted to one side as shown in FIG. 3 in which orientation pin 45 is raised out of its corresponding depression 47.

Similarly arm 22 may be pivoted leftward as seen in FIG. 3 to a point that pin 45 would enter depression 46 and arm 22 rotation would be limited by pin 45 engaging ends 47A, 47B of depression 47 in which case pin opposite 44 would be raised out of depression 46.

It is seen then that the sector depressions 46,47 cooperating with pins 44,45 serve to limit rotation of arm 22 regardless of the pivotal orientation of the arm. The degree of rotational limitation will be determined by the angle subtended by sector depressings 46,47. In the embodiment shown 46,47 each subtends on angle of approximately 90 degrees but this can of course be modified in the fabrication of upper block 14.

Having thus described the invention with particular reference to the preferred forms thereof, it will be obvious that various changes and modifications may be made therein without departing from the spirit and scope of the invention as defined in the appended claims.

What is claimed is:

1. A workholder device comprising:

a base member;

a cylindrical block having an opening through the upper portion thereof and an internal wall;

means to secure said base member to said cylindrical block;

lock pad means located within said cylindrical block;

spherical ball means positioned on said block pad and extending through the upper opening of said cylindrical block;

arm means secured to said spherical ball extending through said cylindrical block opening to receive a work piece;

the internal wall of the cylindrical block having elongated arcuate depressions; and means secured to the spherical ball extending into said depressions to limit the rotation of the said arm means.

2. The workholder device set forth in claim 1 in which said elongated arcuate depressions are two in number.

3. The workholder device set forth in claim 2 in which said elongated arcuate depressions subtend equal accurate angles.

* * * * *